United States Patent [19]

Baumgart et al.

[11] Patent Number: 5,470,659

[45] Date of Patent: Nov. 28, 1995

[54] HOLLOW FIBERS

[75] Inventors: Rudolf Baumgart; Manfred Martin, both of Wuppertal; Lothar Löw, Elsenfeld; Gunter Scheven, Erlenbach, all of Germany

[73] Assignee: Akzo NV, Arnheim, Netherlands

[21] Appl. No.: 17,980

[22] Filed: Feb. 12, 1993

Related U.S. Application Data

[63] Continuation of Ser. No. 617,273, Nov. 16, 1990, abandoned, which is a continuation of Ser. No. 275,591, Nov. 14, 1988, abandoned, which is a continuation of Ser. No. 938,726, Dec. 5, 1986, abandoned, which is a division of Ser. No. 571,519, Jan. 17, 1984, Pat. No. 4,681,720.

[30] Foreign Application Priority Data

Jan. 17, 1983 [DE] Germany ............... 33 01 268.7

[51] Int. Cl.⁶ ............... D02G 3/00; B01D 39/18; B01D 39/02
[52] U.S. Cl. ............... 428/398; 428/376; 428/399; 428/401; 210/500.23; 210/500.29; 55/527; 55/528
[58] Field of Search ............... 428/357, 369, 428/376, 398, 399; 210/500.23, 500.29; 55/16, 527, 528

[56] References Cited

U.S. PATENT DOCUMENTS

| | | | |
|---|---|---|---|
| 3,723,238 | 3/1973 | Werner et al. | 428/369 |
| 4,130,689 | 12/1978 | Costa, Jr. | 428/398 |
| 4,219,426 | 8/1980 | Spekle et al. | 210/500.23 |
| 4,242,411 | 12/1980 | Costa, Jr. et al. | 428/398 X |
| 4,288,494 | 9/1981 | Porter et al. | 428/399 X |
| 4,291,096 | 9/1981 | Taylor | 428/399 X |
| 4,308,654 | 1/1982 | Bogart et al. | 55/16 |
| 4,315,819 | 2/1982 | King | 210/500.23 X |

Primary Examiner—Patrick J. Ryan
Assistant Examiner—J. M. Gray
Attorney, Agent, or Firm—Michael J. Striker

[57] ABSTRACT

A bundle of hollow fibers of uniform diameter, particularly for use in dialysis is formed of a plurality of parallel hollow fibres at least a part of which, prior to the formation of the bundle, is permanently undulated by means of interleaved undulating elements moving opposite the feeding direction of freshly extruded fibres. The undulating elements are in the form of cylindrical rods having a substantially larger diameter than the outer diameter of the fibres so that the wavelength and amplitude of the resulting undulations are substantially larger than the outer diameter of the fibres.

4 Claims, 15 Drawing Sheets

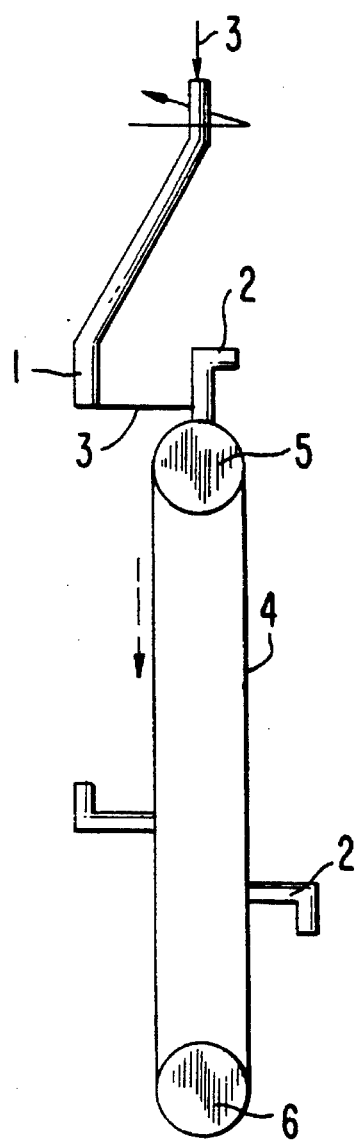
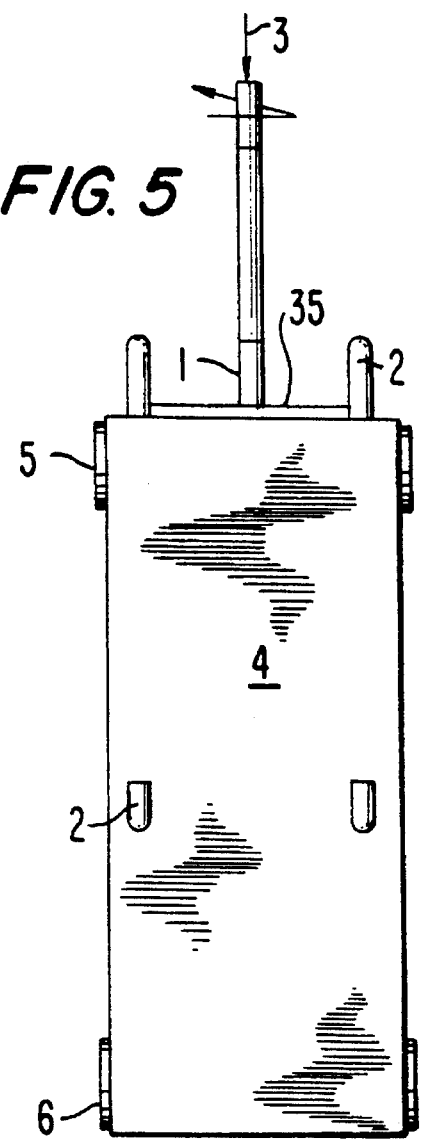
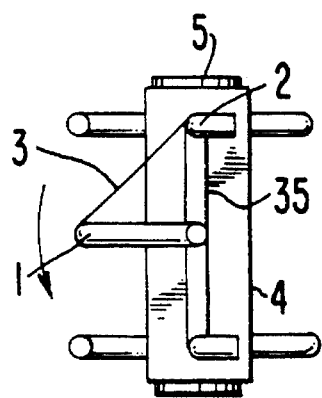
FIG. 4
FIG. 5
FIG. 6

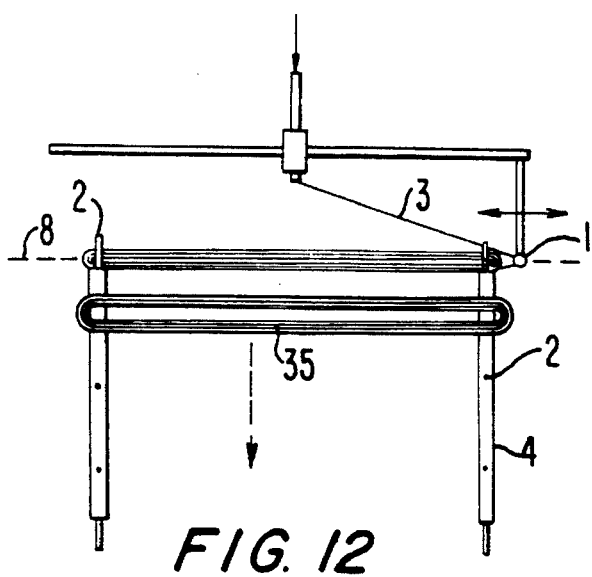
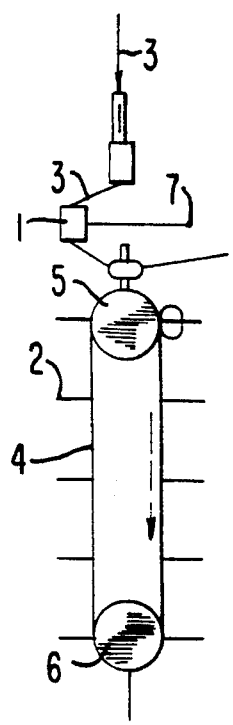
FIG. 12
FIG. 9
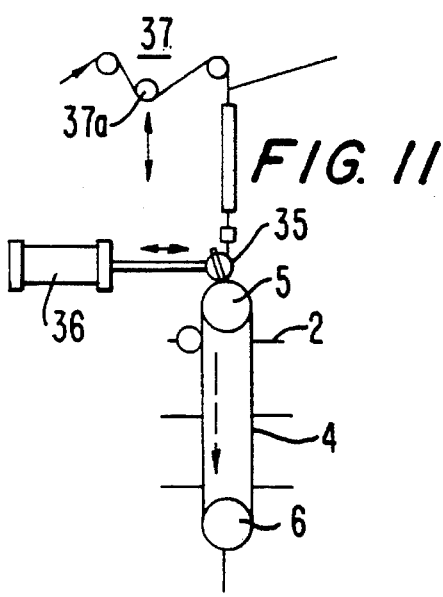
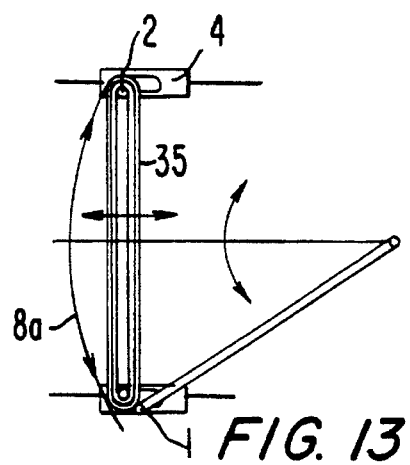
FIG. 11
FIG. 13
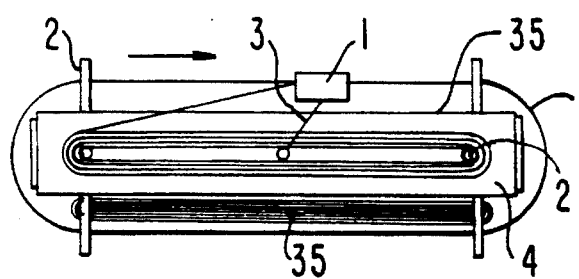
FIG. 10

01# HOLLOW FIBERS

This application is a continuation of application Ser. No. 07/617,273, filed Nov. 16, 1990, now abandoned, which is a continuation of application Ser. No. 07/275,591, filed Nov. 14, 1988, now abandoned, which is a continuation of application Ser. No. 06/938,726, filed Dec. 5, 1986, now abandoned, which is a division of application Ser. No. 06/571,519, filed Jan. 17, 1984, now U.S. Pat. No. 4,681,720.

BACKGROUND OF THE INVENTION

The present invention relates in general to processing of hollow fibers, and in particular to a method of producing bundles of hollow fibers arranged parallel to each other, in which at least one continuous hollow fiber is wrapped by means of a movable guiding device about at least two take-up elements spaced apart from each other, so that a strand of hollow fibers is wound around these take-up elements. This invention relates also to a device for carrying out this method and relates also to a bundle of crimpled or waved hollow fibers.

A method of the aforedescribed kind is known for example from the German publication DE-OS 2,269,949. This prior-art method is based on the application of flexible hollow fiber continuously wound on a coil or spindle, whereby the hollow fiber is taken off by a rotary guiding device and laid in four half shells arranged in pairs. The convex sides of two half shells engage each other and are clamped together, and the two pairs of engaging half shells are aligned in a plane in such a manner that the clearance between the two pairs corresponds to the length of the hollow fiber bundles.

This prior-art method, however, is unsuitable for making bundles of freshly spun hollow fibers, inasmuch as, after achieving the desired thickness of the bundle, the wrapping of the continuous fiber must be interrupted so long until a set of empty half shells is brought into the working position and fixed. Moreover, this known method permits the production of two partial bundles only, namely the two runs of the completed bundle which is formed by joining together the two partial bundles.

Known are also other methods of producing bundles of hollow fibers, for example from the German publication DE-OS 3,102,331, in which the hollow fibers which are reeled on a spool are formed in an annular body of hollow fibers which is subsequently cut into individual bundles. The disadvantage of this known method is the fact that the entire mass of the spool and of the hollow fibers wound thereon must be constantly held in rotation. For this reason, this method is also unsuitable for making bundles of hollow fibers of freshly spun or extruded material. Accordingly, this prior-art method necessitates the use of fibers which are already reeled on a spool. The cutting of the annular body of hollow fibers into individual bundles can be made also only during an interruption of the winding operation, that means during the stopping of the spool.

It is true that there is known a large variety of methods and devices for producing bundles of hollow fibers of the aforedescribed kind, but surprisingly all these prior-art methods are suitable for using hollow fibers which are already reeled on spools, thus necessitating an interruption of the winding process when the wrapped-around strand has attained a desired thickness, and this interruption in the prior-art methods is unavoidable.

SUMMARY OF THE INVENTION

It is therefore a general object of the present invention to overcome the aforementioned disadvantages.

More particularly, it is an object of the invention to provide an improved method which, permits a rational production of bundles of hollow fibers in such a way that the preliminary winding of the fiber on a spool, which hitherto has been necessary, is no longer needed.

Another object of this invention is to provide such an improved method which enables the production of bundles of freshly spun or extruded hollow fibers.

A further object of this invention is to provide such an improved method, in which the cutting of the wound-up hollow fibers into individual bundles and further processing of these bundles, for example the packing of the latter, can be performed on all bundles simultaneously.

Still another object of this invention is to produce loose bundles of hollow fibers which have a high heat-transfer or material-transfer capacity, that means for example which ensure a high throughflow rate or high clearance data.

Still another object of this invention is to provide such an improved method which is generally applicable and can be easily adjusted to particular operational conditions and individual requirements.

An additional object of this invention is to provide a method which permits a simultaneous production of bundles of hollow fibers having different lengths as well as the production of bundles of freshly spun or extruded, crimped or waved hollow fibers.

In keeping with these objects and others which will become apparent hereafter, one feature of the invention resides, in a method of producing bundles of hollow fibers by means of a movable guiding device for a continuous hollow fiber cooperating with at least two mutually spaced take-up elements arranged in the range of movement of the guiding device for taking up a strand of hollow fibers thereon. According to the novel method, after reaching a desired thickness of the strand, that is, in cycles, the two take-up members together with the strand are discharged from the winding position in the range of movement of the guiding device, and simultaneously another pair of empty take-up members is fed into the winding position in the range of movement of the device, whereby if desired additional pairs of empty take-up elements are cyclically moved in the place of the preceding empty take-up elements and then the strand on the first-mentioned take-up elements is cut into bundles of desired length.

The method of this invention is suitable for processing hollow fibers wound on a spool, as well as the freshly spun or extruded hollow fibers. Of course, the advantage of this invention takes effect in processing the freshly spun hollow fibers. Under the term "freshly spun hollow fibers" are those produced in a wet spinning process, in a molding spinning process, in a dry spinning process, or in other known manufacturing processes, whereby the wrapping of the hollow fibers into a strand occurs generally in the condition in which, in prior-art methods, the hollow fibers have been reeled on a spool. That is, conventional processing steps in liquid or gaseous media, cooling, drying, heat treatment and the like are performed before the creation of the strand, or if it is considered as advantageous these steps can be made also at a later time point. It is also possible to process such freshly spun hollow fibers together with the previously reeled hollow fibers, combined at an arbitrary ratio, so as to form bundles of hollow fibers according to this invention.

As mentioned above, the production of bundles according to this invention is continuous, inasmuch as even a momentary interruption of the winding process results in considerable operational interferences and in a high waste. After reaching the desired thickness of the strand, it is therefore necessary to remove the strand as fast as possible and without interference from the winding range. Depending on the arrangement of the fiber take-up elements, it is possible to withdraw the completed strand from the take-up elements by hand. In practice however, such manipulation is in general unsuitable, inasmuch as the hollow fiber bundles can become dirty or damaged. Moreover, the processing of the strands of hollow fibers in bundles, namely the cutting of the strand into sections and the subsequent packing and the like, can be performed generally only at a certain tension of the hollow fibers. For this reason, the strand of hollow fibers should maintain its initial shape as long as possible. Accordingly, it has been proved to be of particular advantage when, in the production method of this invention, the strand of hollow fibers, after reaching the desired thickness, is withdrawn together with the supporting take-up elements from the winding range of the guiding device, and simultaneously an empty set of fiber take-up elements is fed into the winding range and placed into the correct winding position.

This procedure permits an uninterrupted processing of freshly spun hollow fibers in strands for arbitrarily long time periods.

In the method of this invention it is possible to process a single continuous hollow fiber, or if desired it is also possible to process simultaneously a large number of such continuous fibers, for example twenty or more, which are wrapped as a cable around the take-up elements to form the strand. In wrapping the fiber around two spaced take-up elements, a strand is formed having an elongated O-shaped configuration. In wrapping or winding the hollow fiber around more than two take-up elements which are not in alignment with one another, a strand will result having the form of a polygon. During the formation of the strand of hollow fibers, the wound-up fibers remain in rest in the range of movement of the fiber guiding device. Only after reaching the desired strand thickness, that is when the strand contains as many windings as there are hollow fibers required in the completed bundle, is the strand discharged from the winding range swept over by the guiding device, and the set of empty take-up elements is conveyed in the winding range so that the guiding device starts wrapping the fiber around newly supplied set. Hence, the withdrawal of the wound-up hollow fibers in the method of this invention is not continuous, but is made cyclically. This feature has the great advantage that during the standstill of the completed strand of the hollow fibers, that is during the time period between the momentary notion cycles, all conventional processing steps can be performed on the stationary strands, such as for example, binding, cutting into bundles of desired .lengths, packing, and the like.

In producing a polygonal strand of hollow fibers in which each side of the polygon corresponds approximately to the length of the bundles to be produced, it is possible to simultaneously produce a bundle of hollow fibers from respective sections of the polygonal strand.

The method of this invention makes it possible also to produce simultaneously bundles of hollow fibers having different lengths. For this purpose, there are employed at least three fiber take-up elements arranged in a polygonal configuration and wrapped by the hollow fiber in such a manner that a polygonal strand having sides of different lengths is created, whereby the lengths of the sides correspond approximately to the lengths of the produced bundles. In a modification, the sides of the polygon can have the same length, so that bundles of hollow fibers having different lengths in different proportions can be produced from the strand. There is also the possibility to unite several bundles of hollow fibers of the same length into a single, more voluminous bundle, or to produce in this manner bundles having different numbers of hollow fibers.

The method of this invention is suitable for processing all kinds of hollow fibers in bundles of arbitrary thickness. Accordingly, it is possible to produce bundles which are suitable for exchange of substances or the transfer of substances, for heat transfer, for the combined substance-heat transfer, or for other conventional applications of hollow fiber bundles.

Freshly spun hollow fibers in general have a smooth lapper surface and usually are obtained in a substantially straight, only slightly bent shape. This shape is desirable for many applications and has its advantages. However, this shape of hollow fibers has frequently the consequence that, when the fibers are united in a bundle in which contact between the fibers is established over long linear stretches, a part of the adjoining upper surface which affects the heat- or material exchange, becomes ineffective. Also, a uniform circulation of a medium around all hollow fibers assembled in a bundle is frequently unwarranted. In such instances, it is advantageous to process hollow fibers which are to be assembled with a random orientation in a bundle without the use of spacers, in such a manner as to impart to the fibers a form which is considerably different from the rectilinear form. Such deformed hollow fibers facilitate the creation of loose bundles which exhibit an increased quality of the heat- or material transfer through the hollow fiber bundle.

Devices for curling or crimping hollow fibers have already been devised. Hollow fibers which have been crimped in accordance with known methods, however, are designed for a subsequent processing into rayon or staple fibers, for use as filling material in cushions, clothing, and the like. For this reason, in prior-art crimping processes it was not considered as a disadvantage when the fibers became cracked or heavily damaged. On the contrary, in such methods it was intentionally aimed to split the hollow fibers during the crimping, or to divide the fibers into individual fibriles. Therefore, such known methods are not suitable for shaping hollow fibers in a form deviating from a rectilinear form without making the resulting fibers unusable for the aforementioned applications.

Shaping of the hollow fibers in a form which improves the transfer quality of hollow fiber bundles, and in which the probability of damage of the processed fibers is reduced almost to zero, is achieved according to another feature of this invention when the hollow fibers are undulated. A hollow fiber waved in accordance with this invention has, in the preferred embodiment, the form of a uniform sinusoid lying in one plane, or a zig-zag undulation in one plane with alternating bent and unbent sections, whereby the bent sections in which the fiber changes its direction exhibit no cracks or buckles but have a sufficiently dimensioned radius of curvature. In a modification, the fibers undulated according to this invention have the form of a helical spring (a curl) which upon stretching of the fiber transits into a flat waveform. The waveform of the fibers resulting by the method of this invention does not include the shape resulting when a non-undulated hollow fiber in the form of a polygon, resulting for example by winding around a corresponding spool and subject in this form to a fixation process. In the latter form of undulation, no change in direction takes place at the site of bending in the manner as achieved by waving the fiber according to this invention. Moreover, the amplitude of the waves is too small, and the length of the waves is excessively large, and consequently in comparison with results obtained by the wavy shape of this invention with regard to the transfer capacity of the hollow fiber bundles cannot be achieved. The undulation of hollow fibers according to this invention can be irregular, but nevertheless with a certain periodicity, that is with a regular repetition of the same irregular pattern. In practice however, it has been found that a regular waveform of the hollow fibers, such as a regular sinusoid or a zig-zag pattern or a regular helical pattern, is more advantageous.

The processing of strands of undulated hollow fibers into bundles is preferably made in a quasi-stretched condition of the fibers. The loosening of the bundle of hollow fibers can be made for example during its installation in a housing, thereby the installation space in the housing has a length which is shorter than the length of the fibers in the bundle in the stretched condition.

The undulation or waving of freshly spun hollow fibers must be made also in such a manner that the continuity of the production of hollow fibers is not impaired or even interrupted. This means that the undulation or waving is performed either continuously before the winding of the fibers in the strand on the take-up elements or, alternatively, the waving is performed after a completed strand is withdrawn from the winding area. In the latter case, the undulation of hollow fibers is made only after the cutting of the strand into the bundles.

In order to produce waving of the hollow fibers, the latter are brought preferably in a predetermined recurrent form and subject to a fixing process in this form, so that at the end of the treatment the fibers preserve at least partially the shape of this form. In searching for a suitable fixation method, it should be taken into consideration what is the intended use of the hollow fiber bundles, so as to preclude that the wavy shape imparted to the fibers be not lost during the operational application of the bundles.

Depending on the type of processed hollow fibers, a longer time interval may be needed for fixing the wavy shape. For example, the passing of hollow fibers through a gap between teeth of two gears which rotate in mesh with one another without contact would not be sufficient for imparting a permanent undulation to the fibers, because the processing time and speed would be reduced to an intolerable level or, from the technological point of view, can be realized only with great difficulties. According to this invention, a method is devised in which the hollow fibers are guided in a zig-zag fashion about round rods arranged in two planes, and being spaced one from the other so as to undulate the hollow fiber with the same speed at which the fibers are passed through the fixing zone. A device which makes this method possible will be described below in connection with the Figures.

In carrying out this novel method, the distance between the fiber take-up elements and the wavelength of the undulation of the hollow fibers are dimensioned such that in the completed bundle of hollow fibers the undulations are arranged relative to each other with a phase shift, that is the valleys and the crests of the undulations of adjoining fibers are located at different points. This phase shift can be achieved also in a different manner, for example so that the individual fibers in a strand are subject in the fixing zone to undulations at different wavelengths or, alternatively, in the case of uniform wavelengths they are shifted relative to each other in the fixing zone. Such a phase shift of the waved hollow fibers can be achieved also by providing for the hollow fibers different stretches between the waving zone and the strand wrapping device, for instance by adjusting different deflections of the fibers.

Provided that the hollow fibers have a sufficient strength, they can be also drawn about a stationary round rod having a thread-like groove, and in doing so the fibers can be simultaneously subjected to a fixing process so that the helical form which is imparted to the fiber on the screw-like rod is fixed.

Preferably, according to the method of this invention the undulated hollow fibers are discharged from the waving zone substantially in a stretched condition, and then wound in the strand.

In the case when the waving of the hollow fibers is to be made after the formation of the strand, then it is recommended that the strand be first divided into hollow fiber bundles of the desired length and therefore the bundles are subject to undulation in the desired waveform, and subsequently this waveform is fixed in a fixing provision.

The undulation or waving can be also carried out in discrete sections, so that undulated sections in a completed bundle alternate with non-undulated sections.

By simple tests it is possible to find out whether it is necessary to wave all hollow fibers in the bundles, or whether it is sufficient when only a part of the fibers is undulated and what is the minimum proportion between the undulated and straight hollow fibers in each bundle.

Hollow fibers which in order to preserve their form at least during their manufacture are filled with a liquid or a pressurized gas are of course less susceptible to folding in their bending or deviation points, so that in this case smaller radii of curvature can be selected than in hollow fibers which are being processed without the use of pressurized liquid filling up their volume. Different limit measures for the radii of curvatures at which the folding of hollow fibers is avoided are determined in dependence on the mode of processing of the hollow fibers, namely whether they are undulated before their wrapping on the take-up elements or only after the cutting of the strand when the fluid contained in the hollow fibers has the opportunity to escape from the latter.

As mentioned before, in the method of this invention both the strand of hollow fibbers which is being wound in the processing zone, and the completed strand or strands which were discharged from the winding zone, remain mostly in a stationary condition which is interrupted only intermittently by momentary transportation steps in the manner which has been explained before. Provided that the wrapping or winding of the hollow fibers on the take-up elements is performed in such a way that the completed strand of hollow fibers lies in a substantially horizontal plane, then all straight sections of the strand which are used for the production of hollow fiber bundles are located at the same level even in the case of polygonal strands. Due to this feature the subsequent processing of the strand in bundles is substantially facilitated, inasmuch as it is possible that several workers can simultaneously operate at different sides of the strand. Substantially greater advantages are offered by this kind of strand production when it is aimed to automate as many processing steps as possible, such as for example the compounding of the aforementioned sections of the strand, the cutting of the same into bundles, or packing the same. Moreover, by this means it is possible to perform all these processing steps simultaneously at all sections of the strand by providing devices at the corresponding sections which will be described in greater detail below and are illustrated in the Figures. The automation results in shorter operational cycles both for completion and discharge of a strand of fibers and the subsequent operational steps are made in correspondingly shorter time intervals.

The method of this invention has proved to be of particularly advantage in manufacturing bundles composed of extremely sensitive and thin-walled hollow fibers which necessitate a delicate processing and treatment, and which are prone to damage, breakage, and the like undesired contingencies during their manufacturing and processing. For example, by using the method of this invention, it is possible to successfully handle without increasing normal percentage of waste the freshly spun hollow fibers produced by regeneration of cellulose from cuprammonium-cellulose solutions, in hollow fiber bundles of the aforedescribed kind, which can find application for example in commercially available dialyzers, whereby excellent ureas-clearance values are obtained. Such hollow fibers, after extrusion from the spinning nozzle, pass through different washing and treatment stations in which the fibers are immersed in various liquid baths and dried before their winding. During this processing cycle the waving of the hollow fibers can be made for example in the drying zone, whereby the still wet hollow fibers are shaped with the desired waveform and then dried in conventional manner in bulk before, by applying a slight but sufficient tension to the fibers, they are again stretched in a linear form and wound in a strand on the take-up elements.

The method of this invention is successful in the production of bundles of hollow fibers whose wall thickness is in the range between 3 and 20 microns, and whose inner diameter is in the range between 100 and 300 microns. Preferably, the processed hollow fibers have a wall thickness of about 5 microns or 8 microns and an inner diameter of about 150 microns or approximately 200 microns.

Hollow fiber bundles made of freshly spun fibers and waved according to this invention have typically a urea-clearance which is 75–100% higher in comparison with bundles made of non-undulated fibers.

Hence, the method of this invention permits for the first time production of bundles of hollow fibers having the requisite material- and heat transfer quality without necessitating the hitherto unavoidable stage of reeling the hollow fibers on spools serving as the starting stage in the production of the bundles. The possibility to process in bundles the hollow fibers in their original condition as well as in waved condition with an arbitrary intensity of waving, means that the method of this invention is practically unlimited with regard to its adjustment to the needs and operational requirements of the final product, and is capable of further modifications and developments on the basis of the inventive concept.

The increase of the heat- and material transfer quality of bundles of undulated hollow fibers with respect to bundles composed of non-undulated fibers can be determined at least qualitatively by measuring pressure .losses of a fluid passing through the hollow fiber bundles. For this purpose a bundle of undulated hollow fibers produced according to this invention is accommodated in a correspondingly dimensioned, preferably tubular housing, which at the ends of the bundle is connected to pressure-measuring devices. When a fluid such as water flows through the hollow fiber bundles, then the pressure loss which is dependent on the time rate of the stream volume can be determined. When in the same or similar housing a bundle of non-undulated hollow fibers is inserted and is the same measurement is performed, then it Will be recognized that the bundle of undulated hollow fibers produces a higher pressure loss than a bundle of non-undulated fibers. To make this difference more apparent, it is recommended to employ a bundle assembled of very long fibers for performing such measurements. Besides, the hollow fibers can be closed at one end, so that no throughflow occurs, but the medium circulates around the fibers. In this manner, only the pressure loss produced by the flow of the medium around the hollow fibers in their longitudinal direction becomes effective.

Comparative measurements were made by way of an example on a bundle of freshly spun non-undulated hollow fibers acquired by regeneration of cellulose from a cuprammonium-cellulose solution, and of correspondingly produced undulated fibers. The length of the bundles amounted to 250 mm, and the bundle contained 1000 hollow fibers having an outer diameter of about 216 microns and an inner diameter of about 200 microns, and accordingly a wall thickness of about 8 microns, when measured in dried condition. Each bundle of hollow fibers was arranged in a pipe of an inner diameter of 14 mm. The ends of the fibers were closed, so that only pressure loss resulting from the circulation of the medium around the fibers was measured. The hollow fibers in the second bundle had a zig-zag waveform with a wavelength of about 20 mm and an amplitude of about 1 mm.

A stream of water at a temperature of 37° C. circulated in longitudinal direction of the fibers around the bundle. The rate of flow was 2.4 liters per hour. Under these conditions the pressure loss in the case of the bundle of non-undulated hollow fibers was about 4 mm Hg, whereas in the bundle of undulated hollow fibers the pressure loss was about 26 mm Hg. The urea-clearance for the bundle of non-undulated hollow fibers amounted to 95 ml per minute, whereas in the bundle of undulated hollow fibers the clearance was 163 ml/min. Inasmuch as the clearance in the bundle of undulated hollow fibers did not increase in the same extent as did the pressure loss, when compared with the bundle of non-undulated hollow fibers, the experiment shows clearly that the bundle of undulated hollow fibers produced according to this invention, exhibits a higher pressure loss as well as a substantially higher urea clearance than a bundle of non-undulated hollow fibers according to this invention.

In the following paragraphs, a general description of most important features of a device and its embodiments will be presented.

The device for producing a strand of hollow fibers has the following characteristic features: A movable fiber guiding member, at least four fiber take-up elements arranged in pairs and being supported for movement in such a manner that at least a pair of fiber take-up elements is forced to stay in a preparatory position outside the winding range swept over by the fiber guiding device so long until another pair of take-up elements is present in a working position in the winding range, whereby the first-mentioned pair of take-up elements is displaced from its preparatory position into the working position in the winding range without impairing or interrupting the winding process by the guiding member, while the first-mentioned pair of take-up elements is discharged from the winding range.

In an embodiment of the device of this invention, there can be provided an arbitrary number of groups of fiber take-up elements, each group containing either the same number or a different number of these elements. In order to cut the hollow fiber strands into individual bundles, and to bind or pack the bundles, there can be provided additional devices for performing these functions.

The fiber guiding device or mender can move either along a circular path or along a longitudinal closed path such as for example an elliptical path, or can move back and forth along a rectilinear path or along a circular section. When the fiber guiding member performs a reciprocating movement, the pair of fiber take-up elements located in the working position below the guiding member moves back and forth in the direction which is substantially perpendicular to the direction of movement of the guiding member. This back and forth movement of the take-up elements is performed always at the point when the fiber guiding member reaches its end position, whereby the take-up elements cross the path of the guiding member.

The device for producing bundles of undulated hollow fibers exhibits additionally the following characteristic features: a device by means of which the hollow fibers are forcibly shaped in a sinusoidal shape, in a zig-zag, and the like. This undulating device can be arranged before the strand forming device and be moved with the same speed at which the hollow fibers are fed to the winding device; there is also provided a fixing zone in which the wavy shape imparted to the hollow fibers is permanently fixed.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a side view of still another modification of the device of FIG. 1, including three pairs of fiber take-up elements;

FIG. 5 is a front view of the device of FIG. 4;

FIG. 6 is a top view of the device of FIG. 4;

FIG. 9 is a side view of another embodiment of the device of this invention for producing strands of hollow fibers by means of a plurality of pairs of fiber take-up elements arranged on an endless band or chain conveyor and cooperating with a fiber guiding device moving along an elongated closed path;

FIG. 10 is a top view of the device of FIG. 9;

FIG. 11 is a modification of the device of FIG. 9, in which the fibers guiding member moves back and forth along a rectilinear path;

FIG. 12 is a front view of the device of FIG. 11;

FIG. 13 is a top view of an embodiment of the device of this invention for producing strands of hollow fibers by means of a pair of fiber take-up elements cooperating with a fiber guiding member which is movable back and forth along a curved path;

DESCRIPTION OF THE PREFERRED EMBODIMENTS

Figure 1:
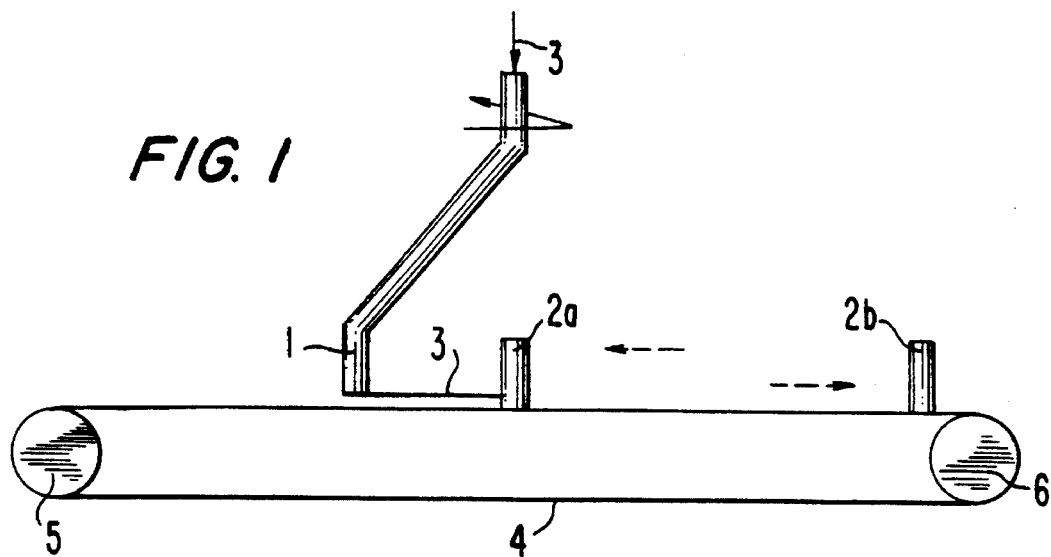
FIG. 1 is a schematic side view of a first embodiment of the device of this invention for producing strands of hollow fibers by means of two pairs of fiber take-up elements.
Figure 2:
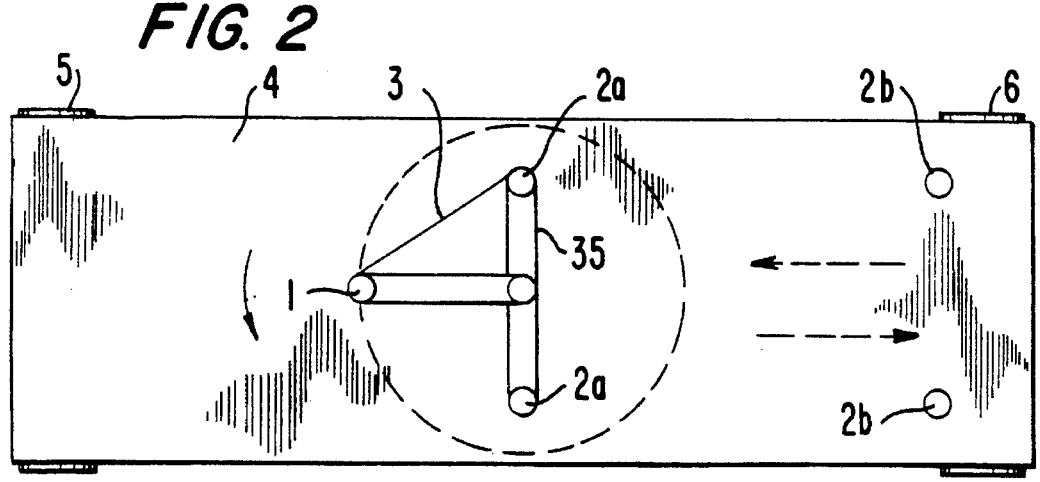
FIG. 2 is a top view of the device of FIG. 1.

FIGS. 1 and 2 illustrate an embodiment of a device for producing strands of hollow fibers. The device includes a fiber guiding member 1, a first pair of fiber take-up elements 2a, a second pair of fiber take-up elements 2b, both pairs of take-up elements being fixedly mounted on an endless conveyor belt 4 circulating about two conveyor rolls 5 and 6. The rollers keep the conveyor belt in taut condition and are set into rotation by non-illustrated driving means. A rotary fiber guiding member 1 is arranged above the upper run of the conveyor belt and rotates about an axis of rotation in the direction indicated by an arrow. The upper end of the guiding member 1 coincides with the axis of rotation, whereas its lower end is offset from the latter, so that hollow fiber 3, which is fed in the guiding device in the direction of its axis of rotation, is guided at the outlet end along a circular path enclosing a working position of the first pair of take-up elements 2a, so that the hollow fiber 3 is wrapped around the two take-up elements, and an elongated strand 35 is wound on the latter. After a sufficient length of the hollow fiber has been wound on the take-up element 2a and the desired thickness of the strand 35 has been reached, the drive of the conveyor belt is activated, the first pair of take-up elements 2a together with the wound-up hollow fiber strand are moved out of the range of winding to the left, and simultaneously the empty pair of take-up elements 2b advances to the vacant working position in the winding range of the guiding member 1, which continues its winding operation. At this moment, the advance of conveyor belt 4 is stopped, and a new strand is wrapped around the elements 2b. The completed hollow fiber strand, which is now located in a non-illustrated processing position at the left end of the conveyor belt, can be removed from the take-up elements 2a or be cut into bundles of hollow fibers of desired length, while the second strand is being formed on the take-up elements 2b. After the second strand is completed, the conveyor belt is activated to move to the right so that the first pair of take-up elements 2a is again in the working position in the winding range of the guiding member 1, and the hollow fiber 3 without interruption is again wound around the first pair of elements 2a. The above described operational steps can be repeated with an arbitrary frequency.

Figure 3:
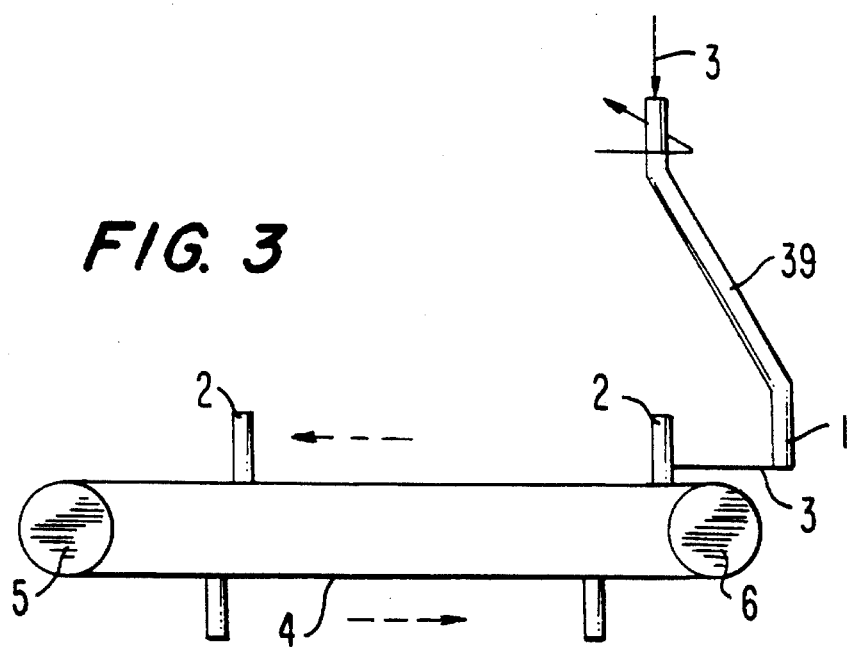
FIG. 3 is a modification of the device of FIG. 1 including four pairs of fiber take-up elements.

In the embodiments of the device of this invention illustrated in FIG. 3, there are provided, on the conveyor belt 4 eight take-up elements 2 arranged in four pairs. In this embodiment, the conveyor belt 4 is intermittently activated in the same direction indicated by dashed arrows. The momentary advance of the conveyor belt lasts so long until a pair of empty take-up elements is situated in the working position in the winding range of the guiding member 1.

A modification of the device of FIG. 3 is illustrated in FIGS. 4–6, in which three pairs of take-up elements 2 are arranged on the conveyor belt 4, which also intermittently circulates in the same direction indicated by the dashed arrow. In this embodiment, the conveyor belt is adjusted vertically so that the conveyor roller 5 is located in the winding range of the member, and the other conveyor roller 6 is located below the roller 5. The six take-up elements 2, which are arranged in three pairs, are hook-shaped so as to prevent the slippage of the completed hollow fiber strand 35 when the conveyor belt is activated and the strand is displaced into its processing position.

The hollow fiber strands produced in the devices according to FIGS. 1–6 have a stretched O-shape. Even this form can be considered as a polygonal form, defining two angles.

Figure 7:
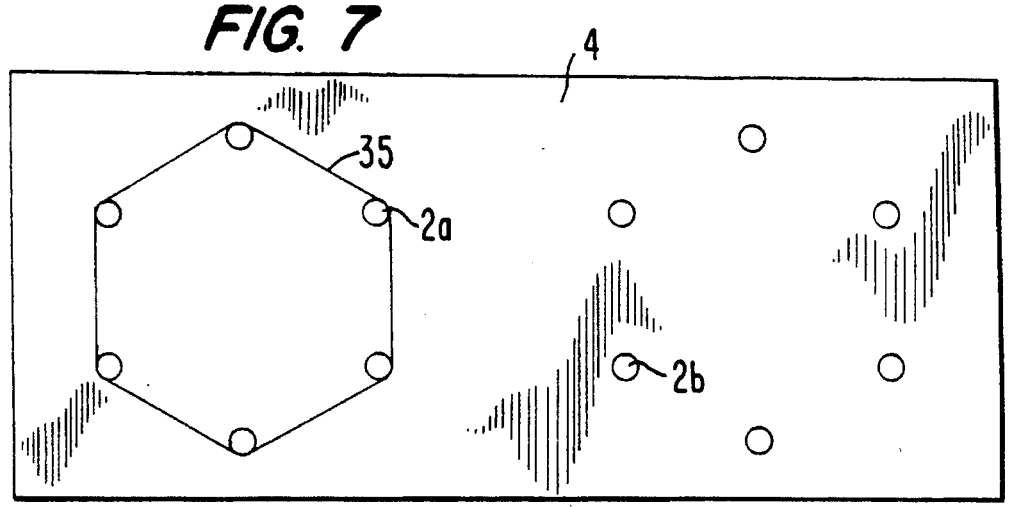
FIG. 7 is another embodiment of the device for producing strands of hollow fibers, including two groups of fiber take-up elements arranged in regular hexagons each including six elements.

In the embodiment of the device for producing hollow fiber strands 35 according to FIG. 7, there are provided two groups of six fiber take-up elements 2a and 2b mounted on the conveyor belt 4 and each forming a rectangular hexagon. The remaining component parts of the device, such as rotary fiber guiding member 1 and the driving rollers 5 and 6, are identical with those in the preceding embodiments and are not illustrated. By wrapping one or more hollow fibers 3 around the take-up elements 2a or 2b a strand 35 is formed which has the form of a regular hexagon. By cutting the straight parts of respective sides of the hexagon, that is those parts which extend between the curved portions of the fibers adjoining the round take-up elements, altogether six bundles 33 of the same length are produced. This length is only slightly shorter than the center distance of two opposite take-up elements 2a or 2b. Otherwise, the mode of operation of this embodiment corresponds to that of the devices of FIGS. 1 and 2.

Figure 8A:
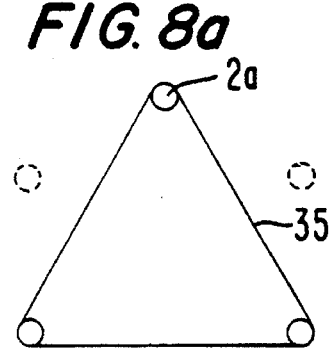
FIGS. 8a–8d show schematically possible modifications of the device of FIG. 7 for producing different polygonal shapes of different size of the produced hollow fiber strands.
Figure 8B:
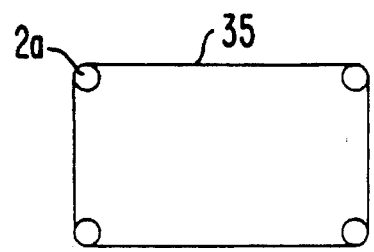
Figure 8C:
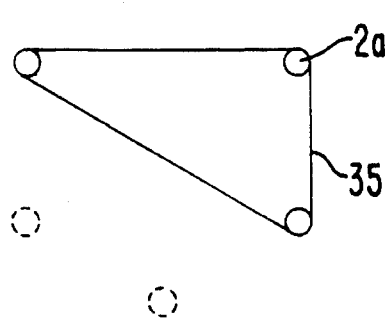
Figure 8D:
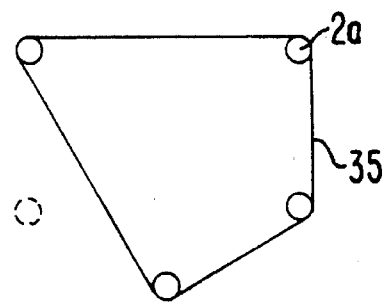

By changing the number of take-up elements in respective groups 2a and 2b in the device of FIG. 7 and wrapping the hollow fiber or fibers around the remaining take-up elements, it is possible to obtain hollow fiber strands of different polygonal configurations, as illustrated in examples of FIGS. 8a–8d. FIG. 8a shows a strand in the form of an equilateral triangle, FIG. 8b the strand in the form of a rectangle, FIG. 8c a strand having the shape of a triangle with three unequal lengths of its sides, or in FIG. 8d an irregular quadrilateral whose adjoining sides have the same length. In this manner it is possible to produce simultaneously hollow fiber bundles of different lengths. If the number of take-up elements 2a and 2b in each group is increased from six to twelve, for example, so as to form a regular dodecagon, then by removing one or more take-up elements a substantial increase of variation possibilities will result in order to produce hollow fiber bundles of different lengths. In addition, the fiber take-up elements in respective groups can be arranged in different polygons processed one after the other.

The operation of devices according to FIGS. 9 and 10 for producing hollow fiber strands is basically the same as in the preceding examples, except in the arrangement of the fiber guiding device 1 which does not rotate about an axis of rotation but orbits along an elongated closed path 7. The path 7 can be also elliptical.

In FIGS. 11 and 12, there is illustrated a device for producing hollow fiber strands in which the fiber guiding member 1 is arranged for a reciprocating movement along a rectilinear path 8. For this purpose, the fiber take-up members 2, at least in their working position, must be swingably supported in such a manner that after the fiber guiding member 1 reaches an end point of its path of movement, the pair of take-up elements 2 is displaced in transverse direction to its opposite end position. In this manner it is made possible that the hollow fiber is wrapped around the spaced take-up elements 2 even during the rectilinear movement of the guiding member. Hence, this path is always crossed by the reciprocating take-up elements. The back and forth movement of the two take-up elements 2 can be imparted by means of a pneumatic, hydraulic or magnetic actuator 36, by a crank drive, or the like. Only during the intermittent motion of the conveyor the oscillating drive must be temporarily disengaged from the take-up elements 2. In FIG. 11 there is illustrated a control device 37 including axially mounted rolls which act as an energy store to compensate for variations in the tension of the hollow fiber supplied to the guiding member or discharged from the latter, thus guaranteeing a constant tension of the wound around fiber. These fiber oscillations are neutralized by the upward and downward movements of the suspended roll 37a. This tightness-controlling device 37 can be also arranged in a regulating circuit which affects the rotary speed of the fiber guiding device 1 in such a manner as to synchronize the intake velocity of the fiber with its discharge. Moreover, the tightness control device 37 of this type or of another type performing the same function can be also provided in the previously described embodiments of the device of this invention. The tightness-controlling devices influence in favorable manner the interference-free exchange of the wrapped up and empty take-up elements 2 during their cyclic advance.

Instead of moving back and forth on a rectilinear path, the fiber guiding member 1 can perform a reciprocating movement on a curved path 8a, as illustrated in FIG. 13. The corresponding back and forth movement of the fiber take-up elements 2 in their working position is performed in the same manner as described before in connection with FIGS. 11 and 12.

Figure 14:
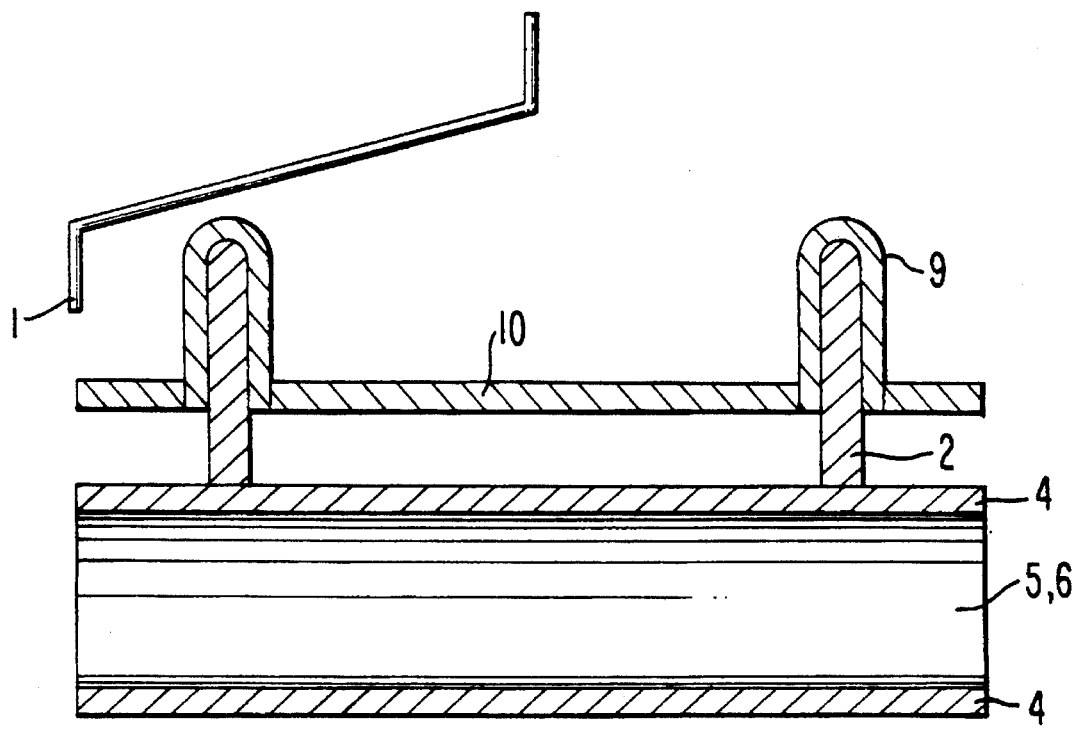
FIG. 14 shows in a sectional side view a device for facilitating the transfer of completed hollow fiber strands.

FIG. 14 illustrates equipment which substantially facilitates the lifting of a non-illustrated hollow fiber strand from the take-up elements 2. This equipment includes tubular attachments 9 closed at their upper ends and insertable on the take-up elements 2. The attachments 9 are interconnected by rod- or plate-like spacer 10 which supports the completed strand during its transportation, so that the latter does not change in its form. Similar aid can be used also for arrangements including more than two take-up elements 2. For example, hollow fiber strands of hexagonal configuration can be transported on a corresponding arrangement of the attachments 9 and the spacer 10.

Instead of conveyors employing bands 4, chains and the like as illustrated in FIGS. 1–14, the fiber take-up elements 2 can be arranged in pairs or larger groups also on an annular disk which is rotatable about its center axis and cyclically activated (carousel principle). Another modification which is technologically more expensive, the take-up elements are fixed on a stationary plate, and the entire winding device, that is the fiber guiding member together with its drive and other component parts, is cyclically moved frown one group of take-up elements to the next one. In the embodiment using a rotary support for the take-up elements 2, all pairs or larger groups of these elements have the same distance from the rotary axis of the supporting plate. In contrast, in the embodiment using the movable arrangement of the complete winding device, the arrangement of the groups of take-up elements can be arbitrary. In a further elaboration of this invention, the positioning of the pairs or larger groups of take-up elements can be controlled according to a program. Furthermore, the conveying means for the take-up elements 2 can be arranged in a single plane and can be cyclically moved similarly as conveying bands used in airports for discharging baggage.

Figure 15:
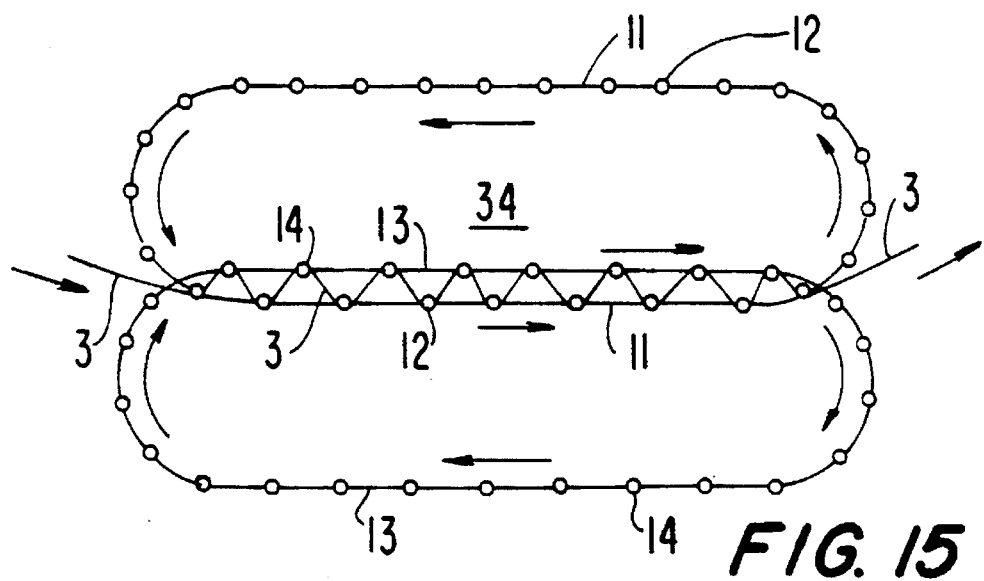
FIG. 15 is a side view of a device for continuous undulation of one or more hollow fibers used in bundles produced according to this invention.

FIG. 15 illustrates, in a schematic form, a device for continuously undulating hollow fibers prior to their processing into bundles. The device includes a pair of superimposed roller chain loops 11 and 14 circulating in opposite directions as indicated by arrows. Each of the roller chain loops carries a plurality of uniformly distributed, horizontally oriented rods 12 and 14 of circular cross section. The round rods 12 in the upper chain loop 11 are spaced apart by the same distance as the round rods 14 on the lower chain loop 13. It will be seen from FIGS. 15–17 that the rods in the lower run of the upper chain loop 11 interleave with the rods in the upper run of the lower chain loop 13, so that hollow fiber 3, which is acted upon by the interleaved round rods, is shaped into a wavy or zig-zag form which can be fixed in a fixing zone 34. For the sake of clarity, driving rollers for the chain loops 11 and 13, as well as other conventional equipment such as chain guides, chain deflecting and tensioning wheels, and the like, are omitted in the Figure. It will be noted that if only a slight undulation or waving is desired there can be employed two endless toothed bells or conveyor belts provided with a similar toothing, whereby the teeth of the facing runs are in mesh without actually engaging each other.

Figure 17:
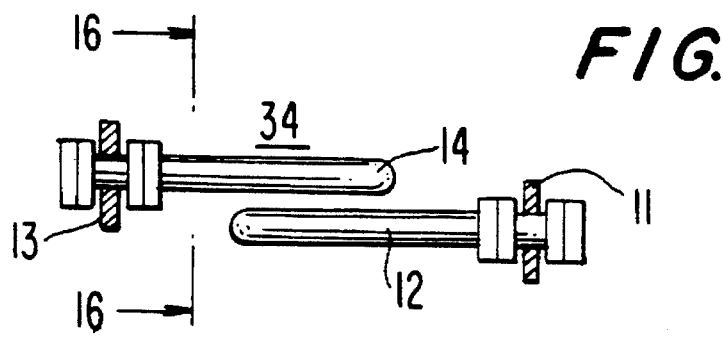
FIG. 17 is a sectional front view of the device of FIG. 16, taken along the line XVII—XVII.
Figure 16:
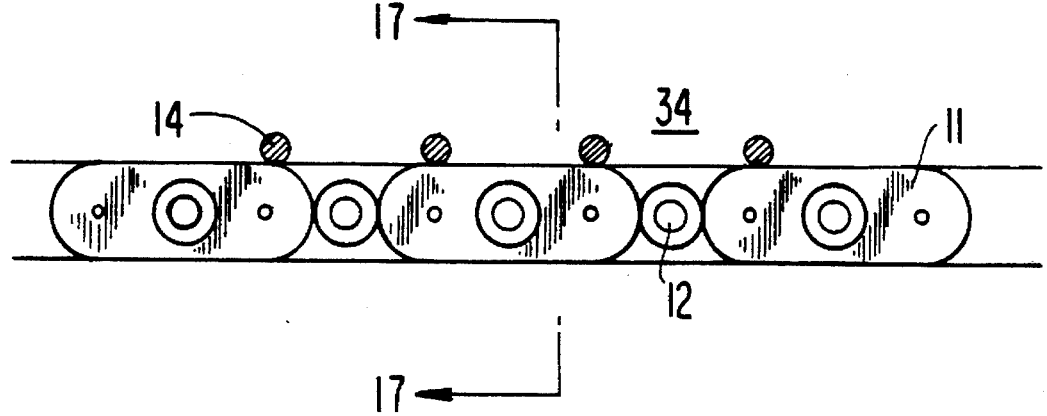
FIG. 16 is a side view of a cut away part of the device of FIG. 15, shown on an enlarged scale.

FIGS. 16 and 17 show in greater detail on an enlarged scale various views of a cut away part on the device of FIG. 15. The duration of the exposure of the fiber 3 to the undulating rods 12 and 14, or to the meshing teeth of the gears, can be adjusted by the corresponding dimensioning of the length of the roller chain loops 11 and 13 or by the rotary speed of the gears. Also, the bending radius of the fibers 3 about the round rods 12 and 14 is controlled by the selection of a suitable radius of these rods. Of course, instead of roller chain loops 11 and 13, it is possible also to employ other types of endless bands, belts and the like. Also, the unilateral fastening of the round rods 12 or 14 as illustrated, in FIG. 17 can be replaced by the arrangement in which two parallel chain loops support the shaping rods at both ends thereof.

Figure 19:
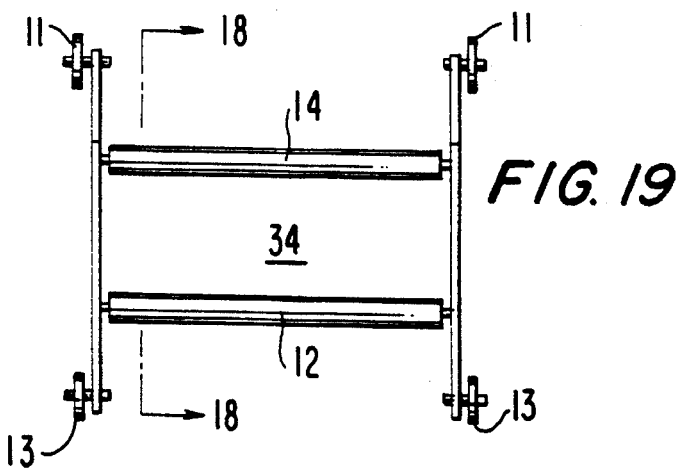
FIG. 19 is a sectional front view of the device of FIG. 18.
Figure 18:
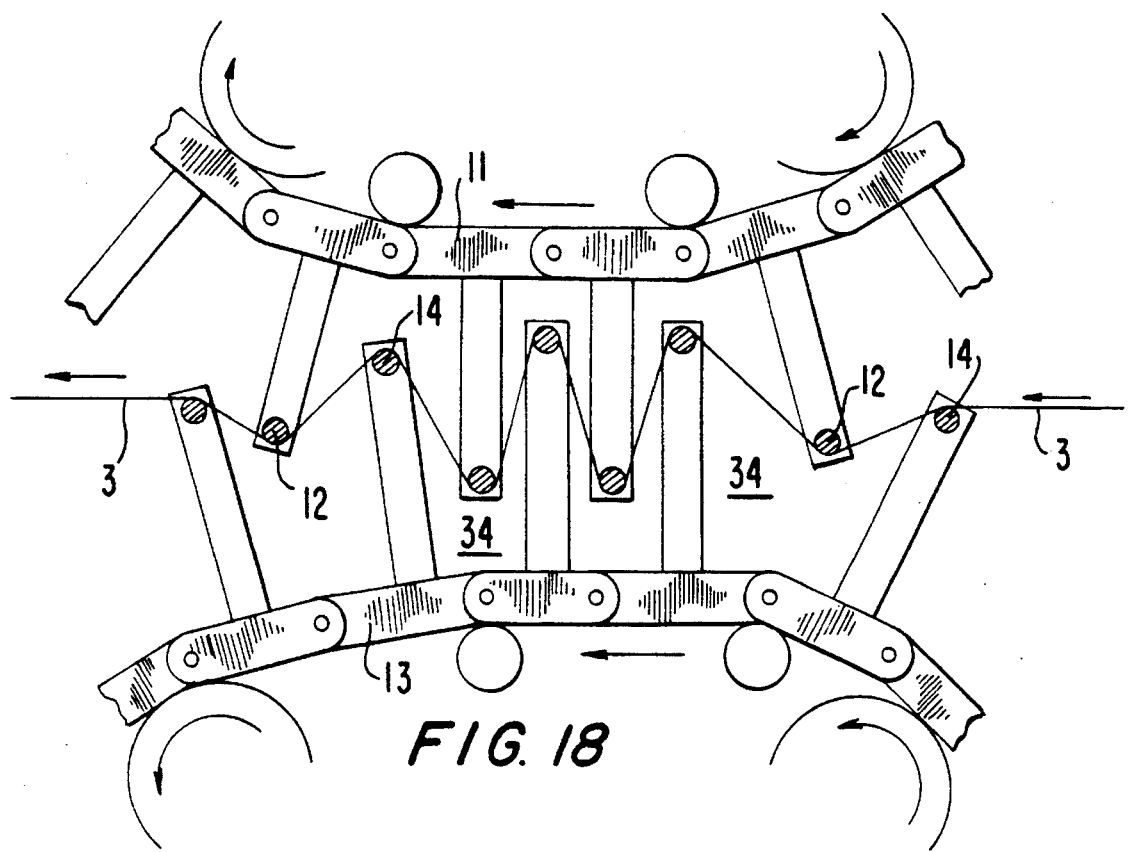
FIG. 18 is a side view of another embodiment of a cut away part of a device for imparting intensive waving to hollow fibers.
Figure 20:
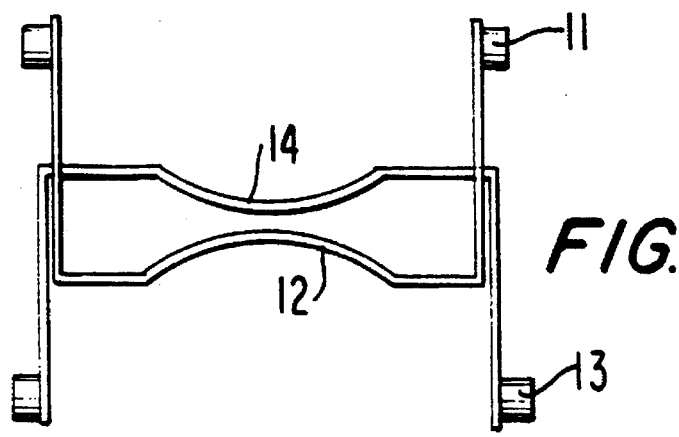
FIGS. 20–26 illustrate in sectional side views various arrangements of rod-like members of the devices of FIGS. 15–19 for imparting a desired wave shape to the fibers.
Figure 21:
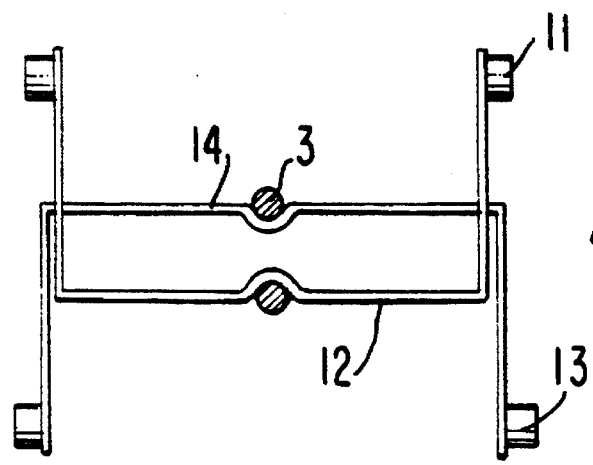
Figure 22:
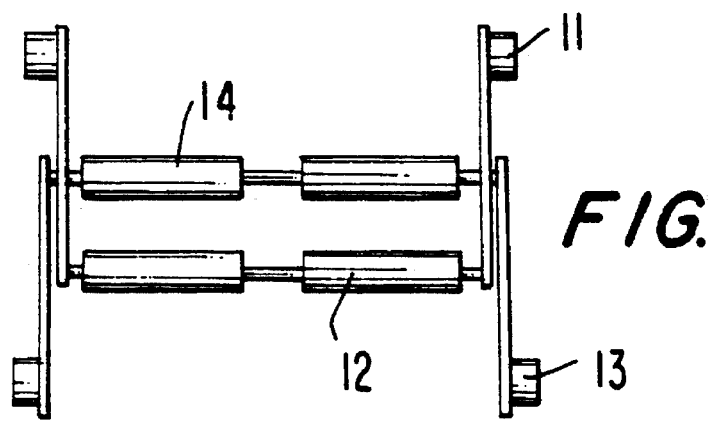
Figure 23:
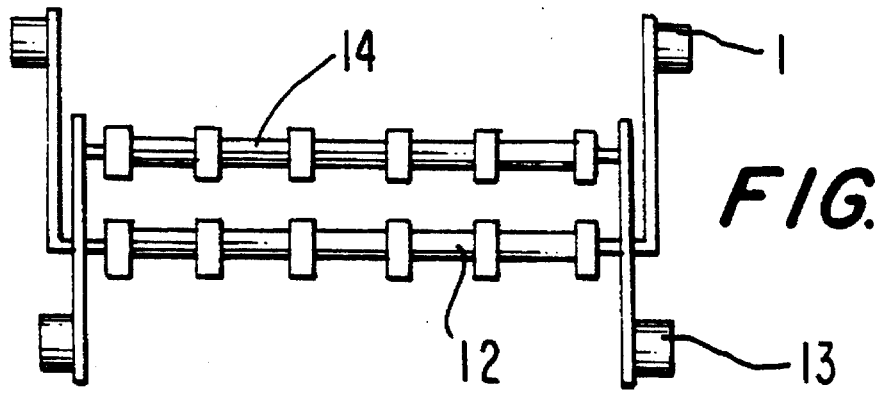
Figure 24:
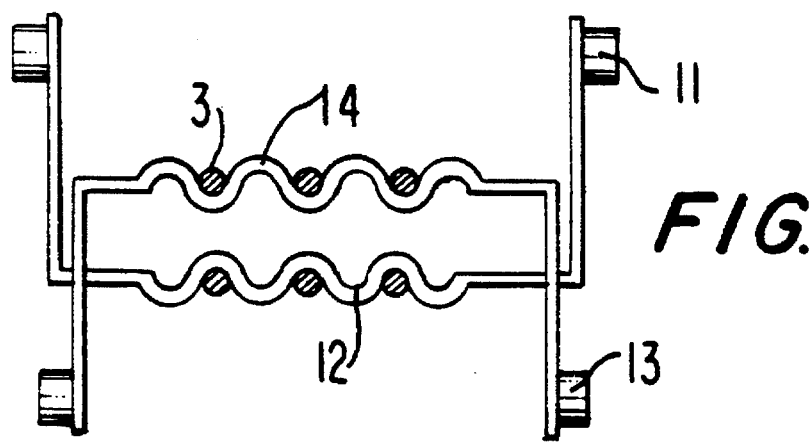

Such a double-sided support of the round rods 12 and 14 is illustrated in FIGS. 18 and 19. In this embodiment, the clearance between the round rods 12 and 14 in the straight section of the runs of the chain loops 11 and 13 is less than the maximum depth of engagement. As a consequence, this arrangement permits a particularly intensive waving of the hollow fiber 3, inasmuch as the looping produced by the interleaved round rods 12 and 14 is increased and the hollow fiber 3 therefore is bent over longer sections of the fiber. As in the preceding example, the bent sections of the fibers are fixed in a fixing zone 34. In this manner, the permanent waveform produced by the device of FIGS. 18 and 19 has a larger amplitude, and consequently after stretching the waved hollow fiber 3 a larger wavelength is obtained.

The embodiments of FIGS. 15–19 show how to adjust the waving intensity, that is the amplitude or the wavelength of the hollow fibers 3 undulated according to this invention.

FIGS. 20–24 show different configurations of undulating elements corresponding in function to round rods 12 and 14 in FIGS. 15, 16 and 18. The rods are provided with a central groove of different cross section which ensure a better guiding or engaging of the hollow fiber 3 supplied individually or as cables or in bands during their waving in the fixing zone 34. The diameter of the undulating rods 12–14 can be for example between 15 to 20 times larger than the diameter of the hollow fibers, provided that no folding or splitting of the fibers in bending areas will occur. For example, hollow fibers of regenerated cellulose having a diameter between 150 and 200 microns can be undulated by means of round rods of 3 mm diameter with a depth of engagement between 0 and 5 mm and at a center distance of the rods of about 9.5 mm, without folding or splitting.

Figure 25:
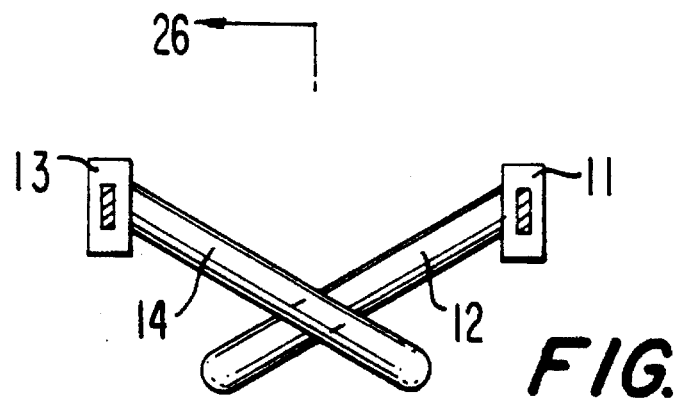
Figure 26:
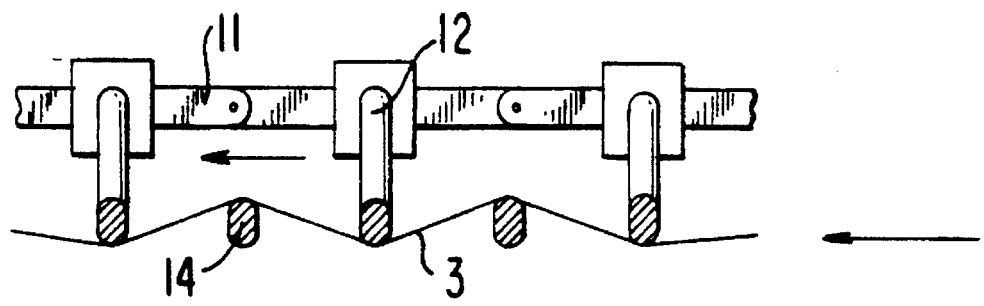

In the arrangement of the fiber waving device illustrated in FIGS. 25 and 26, the hollow fiber or fibers 3 are guided substantially in an intermediate plane between two parallel chain conveyors, each supporting a plurality of round rods inclined at an acute angle to the intermediate plane. It will be seen from FIG. 26 that the hollow fiber is undulated to a depth which corresponds to the diameter of the round rods. Accordingly, the waving achieved in this arrangement has only a small amplitude, which, however, may be of advantage in many applications.

Figure 40:
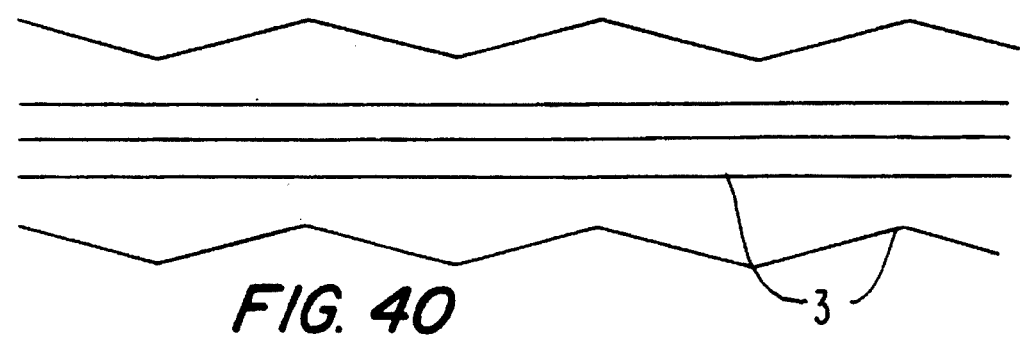

By an irregular distribution or by leaving gaps in a regular arrangement of the round rods 12 and 14, a corresponding irregular undulation is imparted to hollow fibers 3, so that alternating successions of undulated and straight fiber sections are produced. The round rods 12 and 14 can be also arranged in such a manner as to produce alternately different depths or amplitudes of the waving. For example, by combining the embodiments according to FIGS. 15–17 with FIGS. 18 and 19, different waving amplitudes can be obtained. If a shrinkage occurs during the undulation of the hollow fiber 3, then in order to prevent breakage or stretching stress in the latter, an arrangement can be selected in which the depth of engagement of interleaving round rods 12 and 14 gradually decreases in the feeding direction of the fiber in accordance with the shrinkage. In the production of hollow fiber bundles according to this invention, it is possible to form the strand of hollow fibers of undulated fibers and of a portion of straight hollow fibers so that a mixture of undulated and non-undulated fibers is contained in the strand (FIG. 40).

Figure 27:
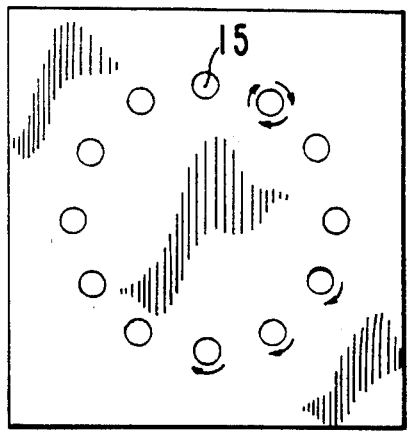
FIG. 27 shows in a front view a device for continuous waving of one or more hollow fibers, whereby the resulting undulated fiber has the form of a helical spring.
Figure 28:
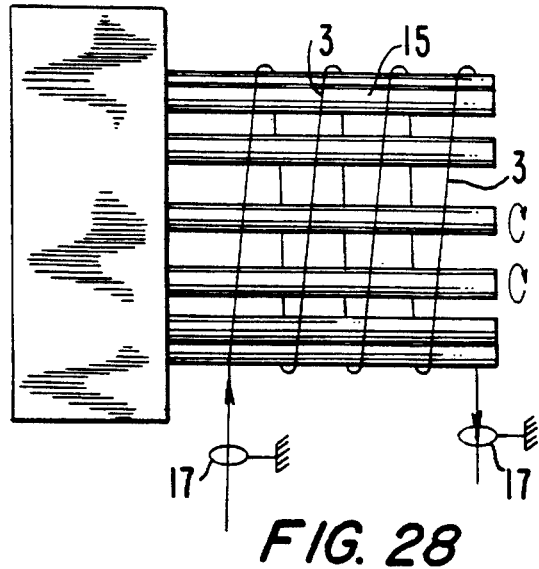
FIG. 28 is a side view of the device of FIG. 27.

FIGS. 27 and 28 illustrate an embodiment of a device for continuous waving of hollow fibers 3. The device consists of a plurality of round rods 15 which are supported for rotation about their longitudinal axes and are uniformly arranged in a circle. A continuous hollow fiber 3, or a cable of several hollow fibers, is wound around the rotary rods 15, and the resulting helical form is fixed. In this manner, the fibers obtain a corresponding wavy form. The withdrawal of the undulated hollow fibers from the crown of the freely rotatable or driven round rods 15 occurs with a minimum lateral slippage, so that this arrangement provides a particularly protective process of imparting undulation to the fibers. Guiding rings 17 provide for fixed feeding and discharging points at the waving run.

Figure 29:
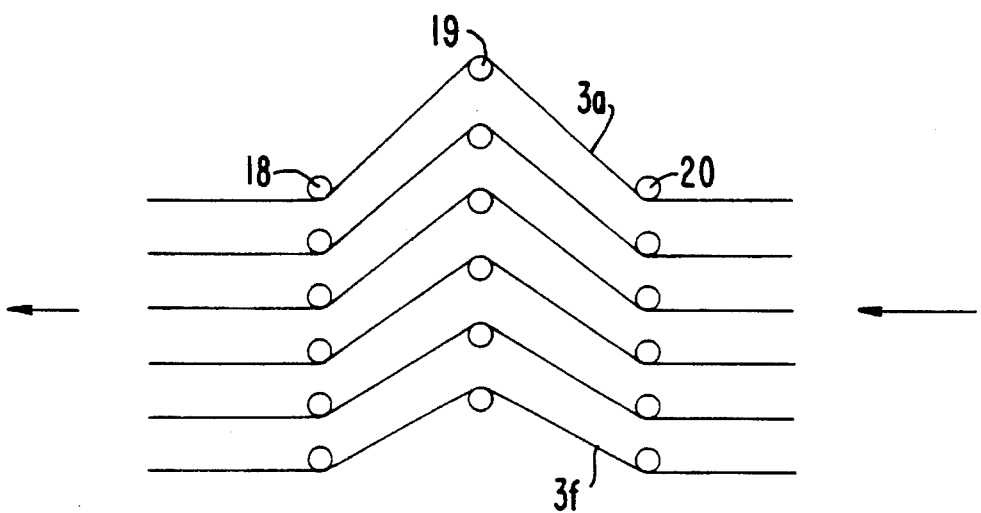
FIG. 29 is a device for adjusting the deflection of undulated hollow fibers so as to produce a phase shift between individual fibers arranged in a strand or bundle.
Figure 38:
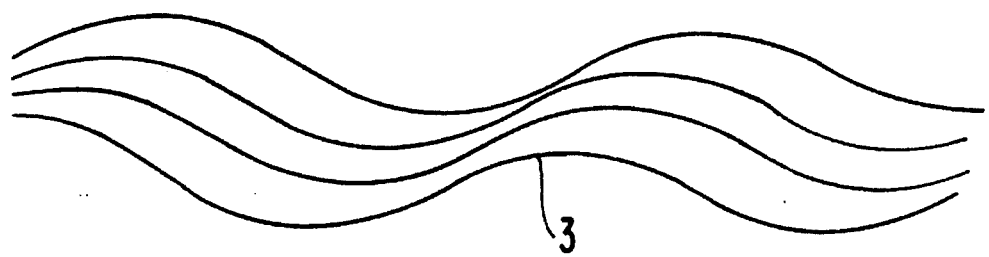

FIG. 29 illustrates means for achieving a phase shift of undulated hollow fibers in a strand or bundle. For this purpose the hollow fibers 3 are guided between round rods 18–20. The guiding rods 18 and 19 are situated in the feeding direction of each fiber, whereas the intermediate guiding rods 19 are laterally offset from the feeding direction. The deviation imparted by the intermediate guiding rods 19 is different for each hollow fiber, so that different lengths 3a–3f are deviated between the uniformly spaced guiding rods 18 and 20. It will be seen from FIG. 29 that the deviated section 3a in the uppermost hollow fiber is laterally offset to a substantially larger degree than the lowermost hollow fiber sections 3f. By suitably adjusting the clearance between the fiber guiding rods 18 and 20 and the position of the intermediate guiding rods 19, it will be achieved that the undulated hollow fibers 3 in completed bundle are shifted in phase relative to each other (FIG. 38).

Figure 31:
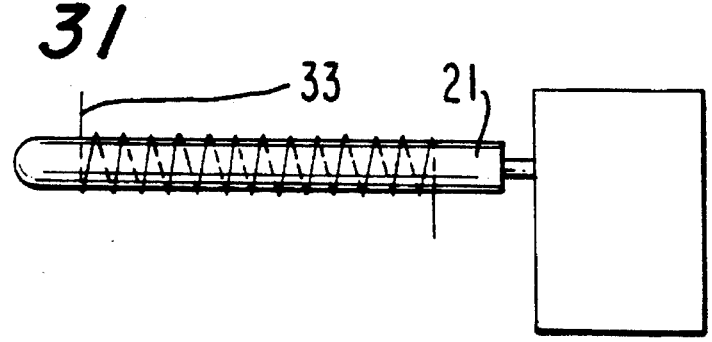
FIG. 31 shows a modification of a device for undulating bundles of hollow fibers produced according to this invention, whereby the bundle is wound up on a round rod and in this condition undergoes a fixing process.
Figure 30:
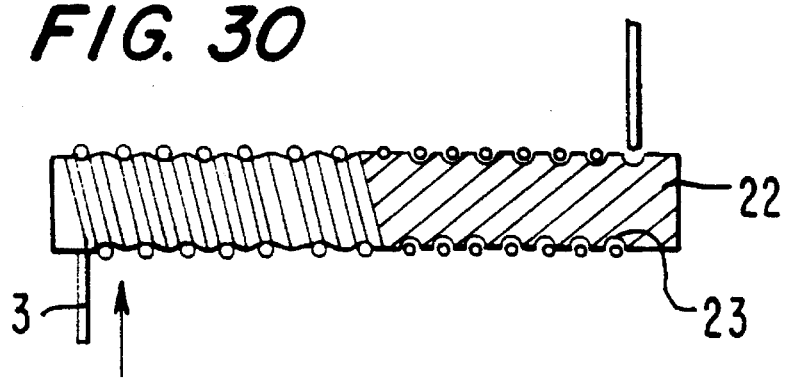
FIG. 30 shows a side view, partly in section, of a device for continuous undulation or waving of hollow fibers, the device having the form of a threaded rod, of which the fiber is forcibly guided so as to receive a screw-like wave shape.

In the embodiment of FIG. 31, the hollow fiber 33 is wound around a single rod 21 and the resulting helical configuration is subject to a fixing process. Hollow fibers of a material having a sufficient strength can be continuously undulated on the device illustrated in FIG. 30. In this arrangement, hollow fiber 3 is wound in screw-like grooves 23 of a threaded rod 22 and continuously drawn in one direction. The imparted helical form is again fixed so that the fiber obtains a permanent undulation.

Figure 32:
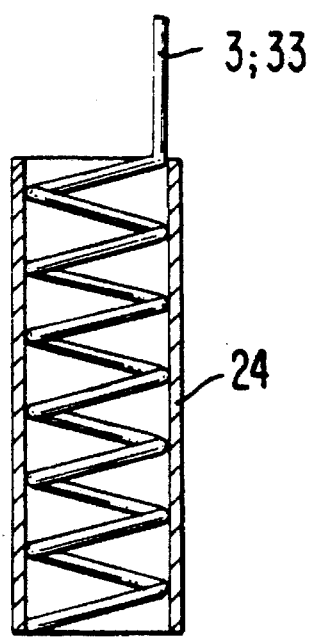
FIG. 32 is another modification of a device for undulating hollow fibers by means of a tubular body in which a helically shaped fiber is inserted and subject to a fixing treatment.

The embodiment of an undulating device according to FIG. 32 is suitable particularly for undulating fibers 3 or fiber bundles 33 of a definite .length. The fibers 3 are rotated to obtain a helical form and are fed into a tubular container 24 where they are subject to a fixing treatment. The container 24 can be provided with a rigid or flexible central core which facilitates production of a coil of the hollow fibers with a desired density.

Figure 33:
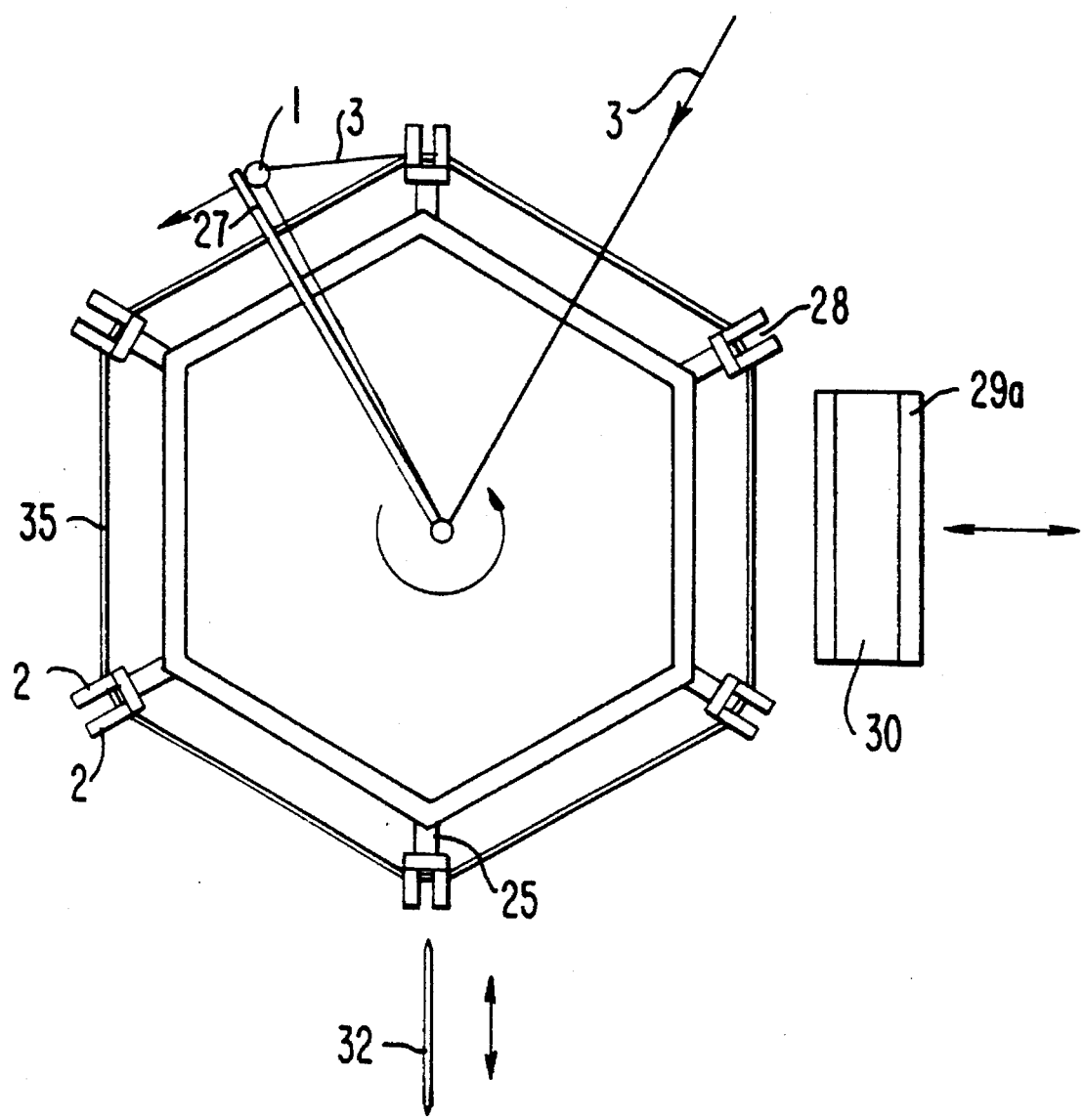
FIG. 33 shows in a top view a preferred embodiment of a device for producing strands of hollow fibers in the form of a regular hexagon arranged in one plane.
Figure 34:
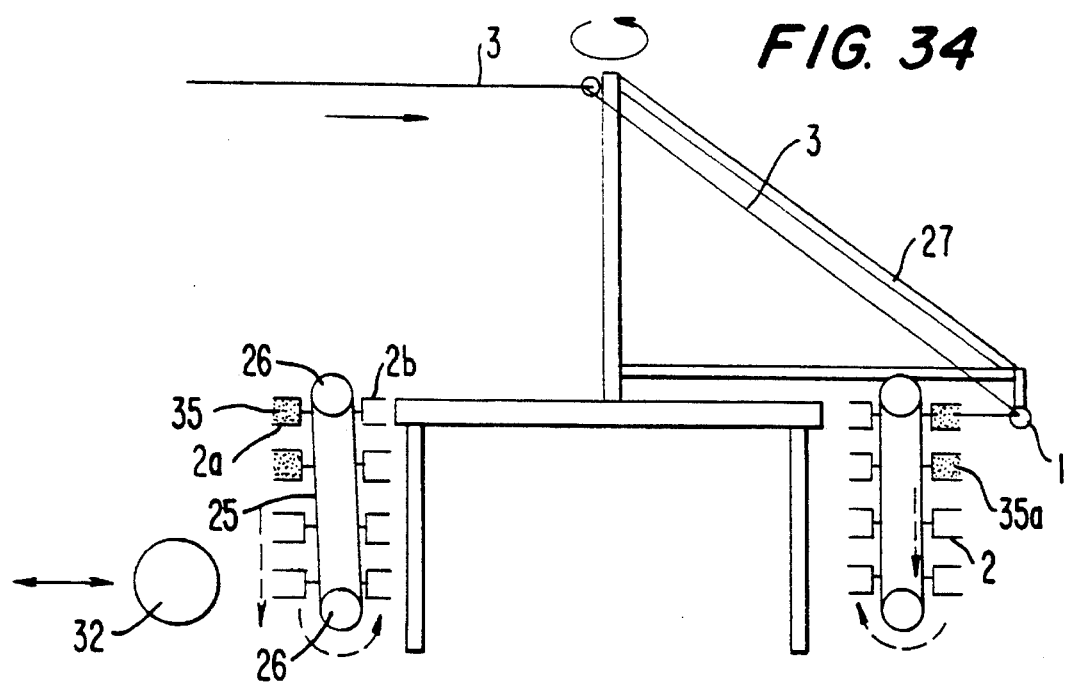
FIG. 34 is a side view partly in section of the device of FIG. 33.

FIGS. 33 and 34 illustrate a particularly advantageous embodiment of a device for producing strands of hollow fibers according to this invention. In this arrangement, the fiber take-up elements 2 have a U-shaped configuration and are arranged in pairs which are uniformly mounted on a plurality of roller chain conveyors 25. In this example, there are used altogether six chain conveyors 25 forming together a hexagon. The lower chains 25 are driven and held in taut condition by sprocket wheels 26 arranged one above the other. The fiber guiding device 1 includes a rotary guiding arm 27 which rotates along a circular path circumscribing the six U-shaped take-up elements 2 located in the winding position at the upper wheel 26. The hollow fiber is laid in the slot 28 between the arms of the take-up elements. After reaching the desired thickness of the hexagonal strand, all six roller chains 25 are simultaneously activated to displace the completed hollow fiber strand 35 from the winding position to a processing position, while a new set of six empty take-up elements 2b in the working position in the winding range of the arm 27. Thereafter, the roller chain conveyors 25 are switched off, and during the standstill the completed strand is processed by cutting, packing, and the like, into the bundles.

Figure 35:
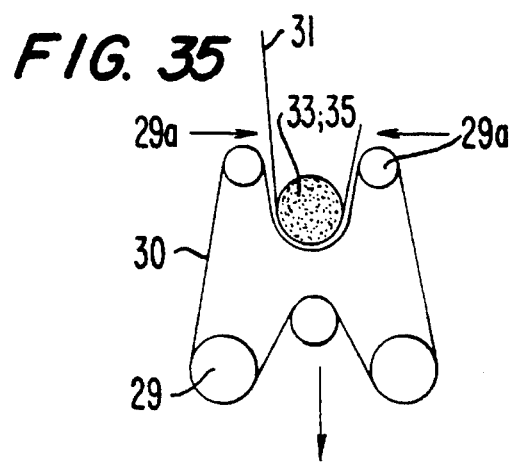
FIG. 35 is a side view of a device for packing hollow fiber bundles produced according to this invention.
Figure 36:
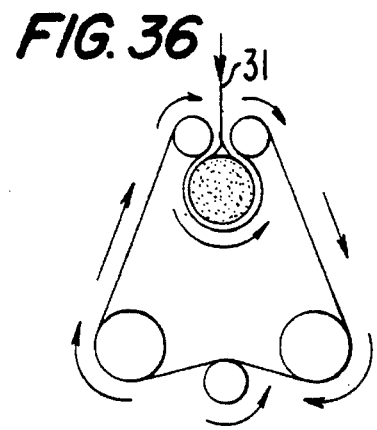
FIG. 36 is the device of FIG. 35, shown in its packing position.

Examples of a preferred embodiment of a device for processing the completed hollow fiber strand 35 into bundles 33 is illustrated in FIGS. 35 and 36. This device, which performs the embracing, clamping and packing of the bundle 33, is illustrated in its ready position on the right-hand side in FIG. 33. The device includes an endless band 30 rotatable about five rollers 29, of which the upper rollers 29a are movable in opposite directions as indicated by arrows in FIG. 35. In a starting position in which the rollers 29a are spaced apart from one another, a packing foil 31 or the like is laid on the belt section between the rollers 29a, and the whole device is moved into a position in which a straight section of the strand 35 is pressed against the foil 31 in a depression of the conveyor belt 30. Thereafter, the two upper rollers 29a are moved against each other, so that the depression is closed as illustrated in FIG. 36. At this moment the hexagonal strand is cut into respective bundles 33, and by rotating the rollers 29 the foil 31 is wrapped around the bundle. In the next step, the foil 31, if desired, can be welded or shrinked against the bundle. The rollers 29a are then moved away from one another, and the packed in hollow fiber bundle 33, 31 is discharged. Preferably, the device 29, 30 is assigned to each side of the hexagonal strand, that is, altogether six hexagonal devices are employed opposite the sides of the hexagonal strand and are operated simultaneously. If however only a single device 30, 29 is used as shown in FIG. 33, the aforedescribed steps must be consecutively executed six times, and non-illustrated clamping means must be used to hold the strand in position in the slots 28 so long until all sides of the strand are processed.

As mentioned before, the devices of FIGS. 15–17 and 33–36 are particularly advantageous for producing bundles of freshly spun and undulated hollow fibers made by the regeneration of cellulose from a cuprammonium solution, whereby the resulting hollow fiber bundle exhibits an excellent urea-clearance effect. Accordingly, such hollow fiber bundles are particularly suitable for blood dialysis. It will be noted that for the first time freshly spun hollow fibers of the aforedescribed types can be directly and continuously processed in bundles which meet all standard requirements.

Very good results have been obtained when the method of this invention, in using the devices of FIGS. 15–17 and 33–36, is also applied to hollow filaments made of porous polypropylene, whereby the dimensions of the fibers are in the aforementioned ranges. Such porous hollow fibers of polypropylene and their methods of production are described for example in the German patent publication 2,833,493.

It will also be noted that the method of this invention and the corresponding devices for carrying out this method is suitable for producing bundles of hollow fibers having most diversified dimensions of their diameters or wall thicknesses.

Tests have been made also with hollow fibers made of other materials than the described polymer fibers with conventional dimensions, and it has been found that the method and devices of this invention present no limitations as far as the material of the fibers is concerned.

Figure 37:
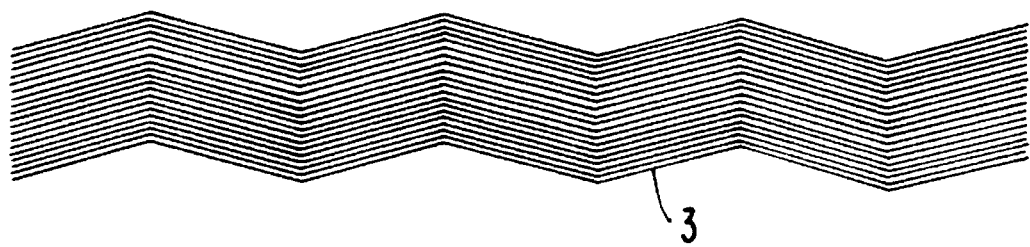
FIGS. 37–40 illustrate different wave shapes of hollow fibers in the bundles produced according to this invention.

FIG. 37 shows a cut away section of a hollow fiber bundle made of zig-zag waved hollow fibers 3. In a typical bundle of this kind, there are employed several hundred hollow fibers, for example. In this example the waving of individual fibers has the same phase, that is the valleys and the crests of the waves coincide with each other. In general, however, the waving of the fibers is shifted, whereby the planes of the waves are oriented at random.

FIG. 38 shows an example of a bundle composed of hollow fibers 3 undulated in a sinusoidal waveform and being arranged in mutually shifted positions in which the wave valleys and crests of individual fibers do not coincide with each other. The bundles of this type contain again several hundred or several thousand individual fibers 3.

Figure 39:
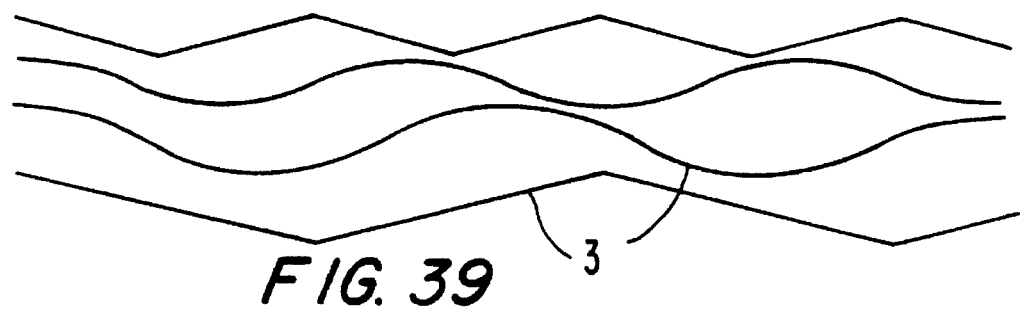

FIGS. 39 shows by way of an example an arrangement of differently undulated hollow fibers of different shapes and wavelengths, as well as of different dimensions and orientations. It will be seen that some of the fibers are undulated in a zig-zag shape, whereas other fibers have a sinusoidal configuration oriented in different planes. The resulting bundle has a particularly loose or slack quality.

FIG. 40 illustrates a bundle composed of zig-zag undulated fibers as well as of straight fibers. It has been found that, in order to achieve a loose bundle, it is sufficient when only a portion of the fibers in the bundle undergo an undulation.

Figure 41:
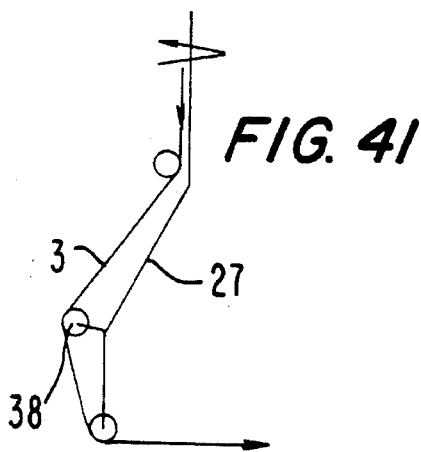
FIGS. 41 and 42 show in side views different modifications of the fiber guiding members.

FIG. 41 shows an embodiment of a fiber guiding device in which the hollow fiber 3 is guided past guiding rollers 38 arranged on the rotary arm 27.

Figure 42:
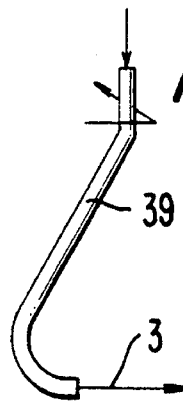

FIG. 42 shows a modification of the fiber guiding device 1, in which the rotary arm is in the form of a tube 39.

It will be understood that each of the elements described above, or two or more together, may also find a useful application in other types of constructions differing from the types described above.

While the invention has been illustrated and described as embodied in specific examples of the method and devices for producing bundles of hollow fibers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapted for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A bundle of 1000, permanently undulated, closed-end hollow fibres made of regenerated cellulose having an amplitude of about 1 mm, an outer diameter of about 216 microns and a wavelength of about 20 mm to produce a pressure loss of about 26 mm Hg during a flowthrough of water having a temperature of 37° C. at a rate of 2.4 liters per hour in a longitudinal direction of the fibres when the bundle has a length of 250 mm and is arranged in a pipe of inner diameter of 14 mm.

2. A bundle of closed-end, permanently undulated hollow fibres, each of the fibres having a wall thickness of from 3 to 20 microns and an inner diameter from 100 to 300 microns.

3. A bundle of closed-end, permanently undulated hollow fibres according to claim 2 containing at least 200 of the fibres and made from a material selected from the group consisting of regenerated cellulose and porous polypropylene.

4. A bundle of 1000 permanently undulated, closed-end hollow fibres made of regenerated cellulose, wherein an amplitude and wavelength of permanent undulations of each of the hollow fibres are adjusted to values at which a pressure loss of about 26 mm Hg develops during a throughput of water having a temperature of 37° C. and circulated at a rate of 2.4 liters per hour in a longitudinal direction of the fibres when measured around said fibres, said fibres have a length of 250 mm, each of said fibres has a wall thickness of from 3 to 20 microns and an inner diameter between 100 and 300 microns and said fibres are arranged in a pipe of inner diameter of 14 mm.

* * * * *